(12) United States Patent
Seitz

(10) Patent No.: US 10,668,420 B2
(45) Date of Patent: Jun. 2, 2020

(54) MODULAR CLEANER FOR AIRBORNE DUST

(71) Applicant: Michael W. Seitz, Houston, TX (US)

(72) Inventor: Michael W. Seitz, Houston, TX (US)

(*) Notice: Subject to any disclaimer, the term of this patent is extended or adjusted under 35 U.S.C. 154(b) by 142 days.

(21) Appl. No.: 15/575,026

(22) PCT Filed: May 25, 2016

(86) PCT No.: PCT/US2016/034138
§ 371 (c)(1),
(2) Date: Nov. 17, 2017

(87) PCT Pub. No.: WO2016/191484
PCT Pub. Date: Dec. 1, 2016

(65) Prior Publication Data
US 2018/0140987 A1 May 24, 2018

Related U.S. Application Data

(60) Provisional application No. 62/166,370, filed on May 26, 2015.

(51) Int. Cl.
*B01D 46/00* (2006.01)
*B01D 46/24* (2006.01)
*B01D 50/00* (2006.01)

(52) U.S. Cl.
CPC ..... *B01D 46/0013* (2013.01); *B01D 46/0068* (2013.01); *B01D 46/2403* (2013.01); *B01D 50/002* (2013.01)

(58) Field of Classification Search
CPC ...... B01D 46/00; B01D 46/0002–0021; B01D 46/0068; B01D 46/2403; B01D 50/002

USPC ............ 55/282–305, 341.1–341.7, 361–382
See application file for complete search history.

(56) References Cited

U.S. PATENT DOCUMENTS

| 3,716,971 | A | 2/1973 | Reinauer |
| 3,837,150 | A | 9/1974 | Kubiak |
| 3,877,899 | A * | 4/1975 | Bundy ............... B01D 46/0013 96/428 |
| 7,479,170 | B1 | 1/2009 | Collette |
| 2010/0095843 | A1 | 4/2010 | Gebert |

(Continued)

FOREIGN PATENT DOCUMENTS

WO  2015039069  3/2015

*Primary Examiner* — T. Bennett McKenzie
(74) *Attorney, Agent, or Firm* — John R. Casperson

(57) ABSTRACT

A modular portable dusty air cleaner comprises a removable bin, a dirty gas distributor, an aperture plate, a plurality of tubular filters, a roof, a clean-gas chamber, a dust collection chamber, and a pulse-jet assembly. The dirty gas distributor is positioned to distribute dirty gas into the dust collection chamber from a periphery of the plurality of filters. The aperture plate forms at least a partial ceiling for the bin. The plurality of tubular filters hangs into the bin from the apertures of the plate, one filter per aperture. The roof is positioned above the aperture plate. The clean-gas chamber is defined between the plate and the roof. The pulse jet assembly is positioned at least partly in the clean-gas chamber. The pulse jet assembly includes a plurality of nozzles for pulsing jets of gas down the plurality of filters, one nozzle per filter to dislodge accumulated dust into the bottom of the dust collection chamber.

4 Claims, 14 Drawing Sheets

(56) References Cited

U.S. PATENT DOCUMENTS

2011/0197767 A1* 8/2011 Seitz .................... B01D 46/002
                                                                                  95/286

* cited by examiner

MODULAR CLEANER FOR AIRBORNE DUST

TECHNICAL FIELD

In one aspect this invention relates to a collector for airborne dust that is assembled from modular components and has a detachable collected-dust bin. In another aspect, this invention relates to collecting airborne dust on an industrial scale with a detachable, removable and exchangeable collected-dust bin. In further embodiments, this invention relates to various components and improvements for a collector of airborne dust.

BACKGROUND ART

There is a growing need for removing dusty air from industrial, work, maintenance or production facilities and cleansing it of entrained dust prior to discharge.

Traditionally, for dust producing facilities operating airborne dust collection systems, fixed dust collection equipment is permanently installed with dedicated collected-dust removal techniques. For shorter term use, however, such systems prove to be costly, difficult to transport, troublesome and risky to service. Further, for any dust collecting system, whether fixed or portable, if the collected dust is considered hazardous, the removal and handling of the collected dust from standard dusty air cleaners can be a challenge requiring special precautions. Difficulties in the handling and decanting of collected dust waste included the risk of spillage, special handling of dust collection bags if used, and special transportation procedures once the collected dust is removed from the original dust collecting system. Airborne dust collectors sized for building or ship remediation or remodeling are typically vehicle-mounted and very expensive to hire. There is a growing need for an dusty air cleaner that is large enough for such duty but is inexpensive enough so that it can be economically left on site and removed for servicing as it becomes filled, either in a temporary or long term airborne dust cleaning role, or that can be serviced on site by relatively simple bin exchange or component or total equipment exchange.

It is an object of this invention to provide a cleaning device for airborne dust that is large in air volume cleaning capacity, and is inexpensive to manufacture and service because of its modular construction. Ideally, the device incorporates a removable bin of the type used commonly by waste handing companies, also referred to as dumpsters. Dumpsters have wide commercial availability, associated loading and transportation trucks, waste disposal methods, and are portable by road transportation means. By using standardized dumpsters or dump trucks or trailers with durably-mounted adequately sealing bins as the collected-dust containers integrated into the modular dusty air cleaner system, the system becomes easily transportable, low cost, and easily serviceable, including for operations requiring longer term usage. In an envisaged commercial use of the modular airborne dust collector with an attached dumpster or dump truck or trailer, a waste disposal company offering dumpsters or equipment for hire and servicing can offer the additional equipment rental for the completion of airborne dust collecting, along with the additional servicing of the units.

DISCLOSURE OF INVENTION

One embodiment of the invention provides a magazine for filter cartridges. The magazine comprises an aperture plate, a plurality of tubular filters, a gas distribution means and a box. The aperture plate defines a plurality of apertures. The plurality of tubular filters hangs from the apertures, one per aperture. The dirty gas distribution means is positioned to distribute dirty gas from a peripheral location with respect to the filters and a pair of parallel tubular sidewalls forming a pair of tunnels spaced apart from each other. The box is formed from four side walls attached to the dirty gas distribution means and extending in a direction normal to the aperture plate and peripherally to the plurality of tubular filters. The box has a height sufficient to contain the tubular filters and an end closure on the box opposite the aperture plate to form a dust collection chamber for collected dust.

The entire device can be disposed of as a unit if replacement is necessary.

In another embodiment of the invention, a portable dusty air cleaner comprises a bin, an aperture plate, a plurality of filters, a roof, and an exhaust fan drawing from the bin. The bin has an open upper end and a closed lower end. The aperture plate defines a plurality of apertures forming at least a partial ceiling for the bin. The plurality of tubular filters hangs into the bin from the apertures, one per aperture. Each of the tubular filters forms a dust collection chamber. A roof is positioned above the aperture plate. A gas chamber is defined between the aperture plate and the roof. The gas chamber is partly defined by a peripheral wall extending between the aperture plate and the roof. At least one exhaust fan is positioned in flow communication with the bin to draw gas from the gas chamber, into and through the tubular filters, and into the bin prior to being drawn out of the bin by the at least one exhaust fan.

The device is useful to finish cleaning partly cleaned air. If desired, the tubular filters can contain active carbon or the like.

Another embodiment of the invention provides a bin for a portable dusty air cleaner that has two long side walls and two short end walls extending upwardly from a floor. The bin is generally box shaped and is longitudinally elongated. One of the end walls is provided with a large through-port just above the level of the floor. The bin has large wedges mounted to the floor in adjacent corners of the bin adjacent to the through-port to channel dust toward the through-port when the other end of the bin is lifted.

Another embodiment of the invention provides a portable dusty air cleaner comprising a bin and a partition wall extending across the bin. The bin has an open upper end and a closed lower end. The partition wall extending across the bin divides the bin into a first chamber and a second chamber. The first chamber has at least one dusty gas inlet in flow communication with it, and the second chamber has at least one clean gas exhaust in flow communication with it. An aperture plate defines a plurality of apertures forming at least a partial ceiling for the first chamber of the bin. A plurality of tubular filters for filtering dusty gas hang into the first chamber of the bin from the apertures, one per aperture. A cover is positioned above the aperture plate, and defines a gas chamber defined between the aperture plate and the cover. The gas chamber is partly defined by a peripheral wall extending between the aperture plate and the cover. A least one exhaust fan is positioned in the second chamber in flow communication with the gas chamber to draw gas from the gas chamber and expel clean gas through the gas exhaust. Dust drawn into the first chamber that is unable to penetrate the plurality of tubular filters accumulates on an outside surface of the plurality of tubular filters.

BEST MODE FOR CARRYING OUT THE INVENTION

Figure 1:
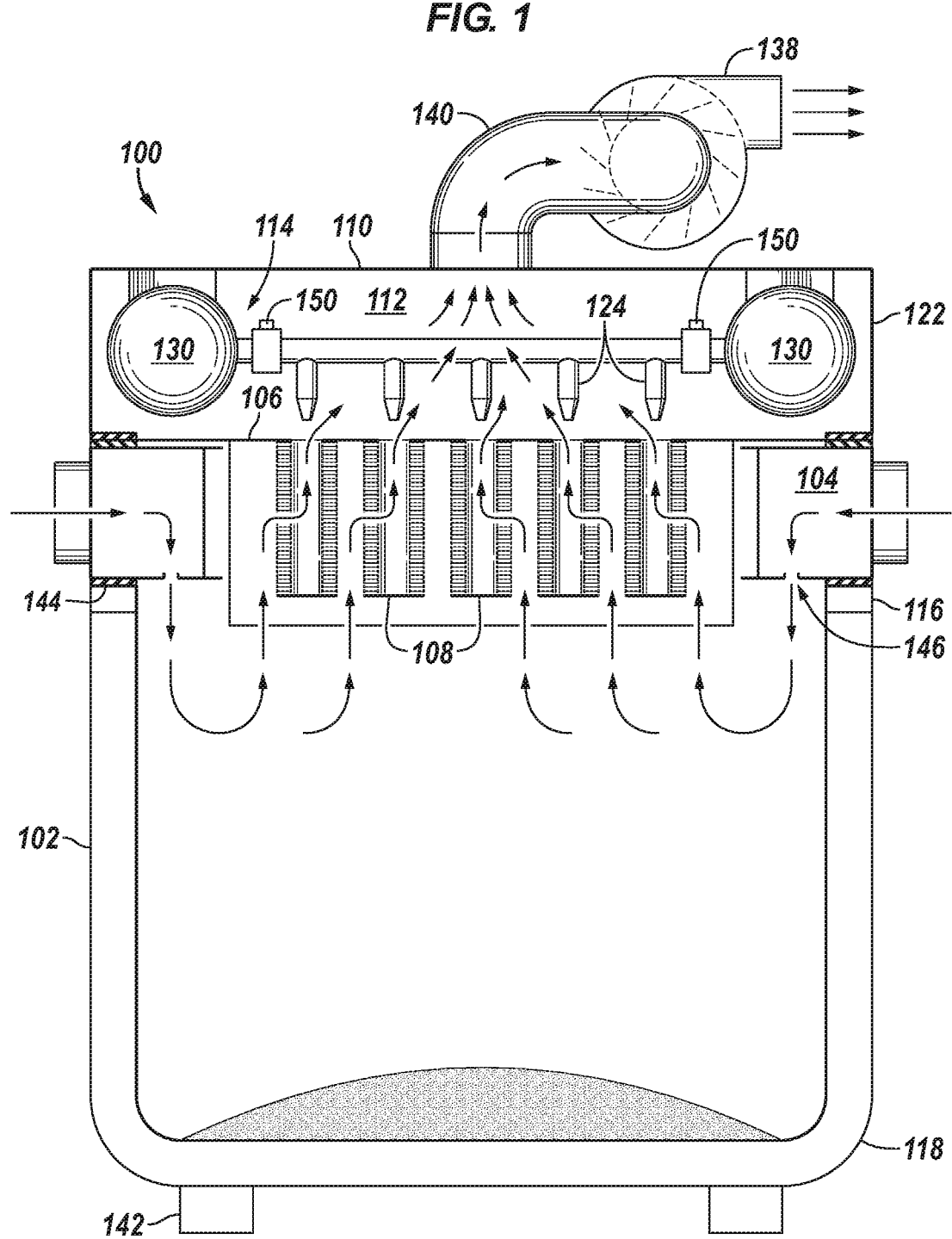
FIG. 1 schematically illustrates a first embodiment of the invention in cross section.

One embodiment of the invention provides a portable device 100, 300 for cleaning dust from dusty air. The device comprises a bin 102, 302, a dirty gas distributor 104, 304, an aperture plate 106, 306, a plurality of tubular filters 108, 308, a roof 110, 310, a clean-gas chamber 112, 312, and a pulse-jet assembly 114, 314. The bin has an upper end 116, 316 and a lower end 118, 318. The dirty gas distributor is positioned to distribute dirty gas around the filters. Dirty air inlet locations for the distributor may be placed to suit external ducting requirements. The aperture plate defines a plurality of apertures 120, 320 and forms at least a partial ceiling for the bin. The plurality of tubular filters hangs into the bin from the apertures, one filter per aperture. The filters can be securely fastened to the aperture plate, for example with a sealing gasket between the filter flange and the aperture plate to prevent bypass leakage of the dirty air into the clean air upper chamber.

In one embodiment of the invention, a non-standard method of securing the filter elements would involve applying a preferably expanding sealant paste or foam to the filter flange, and applying a thin film of release agent onto the aperture plate, and then securing the filter into place with mechanical fasteners, for example by riveting the filter flange to the plate through pre-engineered mating holes in both components. Exchanging spent filters at a later date would require drilling out the rivets, and prying or lifting the sealed filters from the plate below, potentially with the aid of a simple lifting lever, to release the gasket paste from the plate, made easier by release agent originally applied. Installation of replacement filters is then accomplished by simply repeating the insertion and sealing/release agent and riveting process.

Figure 7:
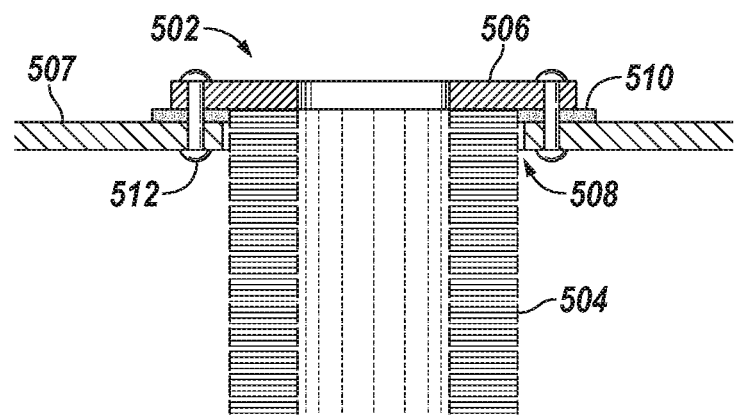
FIG. 7 is a sectional view showing construction details for attaching filters in a preferred embodiment of the invention.

With reference to FIG. 7, a filter 502 having a generally tubular longitudinally pleated body 504 with an upper end flange 506 is dropped into plate 507 aperture 508. End flange 506 is too large to pass through aperture 508. A gasket 510 which can be of conventional structure or of the form-in-place type is positioned between the plate and the flange. The upper surface of the plate can be chemically treated with an agent to aid release of the gasket and flange. Fasteners such as rivets 512 extend though the flange and into aligned holes in the plate to secure the filters to the plate.

Figure 3:
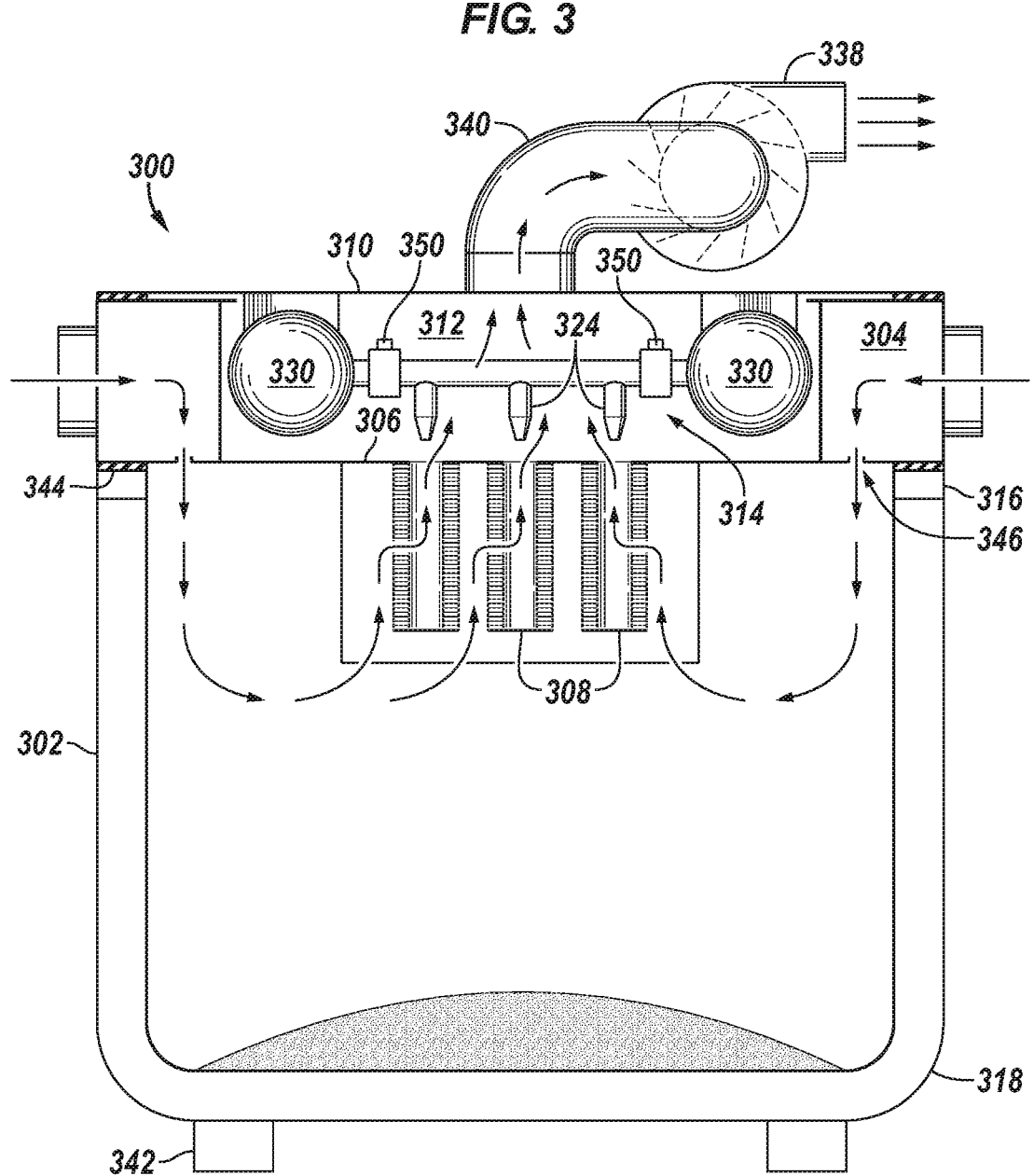
FIG. 3 schematically illustrates a second embodiment of the invention is cross section.
Figure 4:
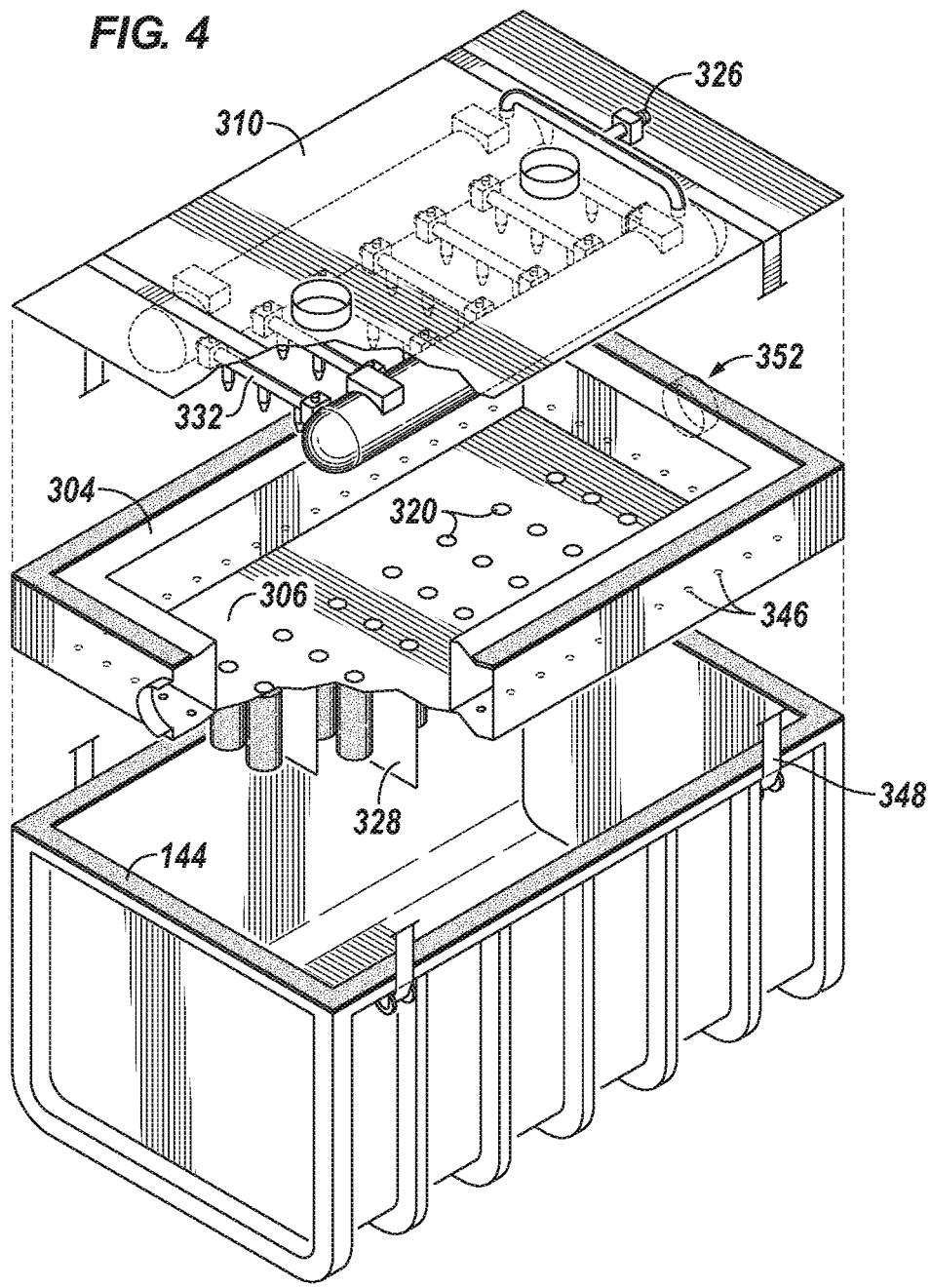
FIG. 4 is an exploded view of the invention of FIG. 3 with portions broken away or in ghost to show details.

The roof is positioned above the aperture plate. The clean-gas chamber is defined between the plate and the roof. The clean-gas chamber is partly defined by a peripheral wall 122, 322 (322 is also the outside wall of gas distributor in FIGS. 3 and 4) extending between the aperture plate and the roof. The pulse-jet assembly is positioned at least partly in the clean-gas chamber. The pulse-jet assembly includes a plurality of nozzles 124, 324 for pulsing jets of gas down the plurality of filters, one nozzle per filter. The location or height of a nozzle above a filter may be varied from fully contained within the filter cartridge to, say, 3 feet (0.9 m) above, depending on optimization for specific applications.

For operation, a source of compressed gas 126, 326 is operably attached to the pulse jet assembly. An air compressor is suitable to charge the pair of air storage tanks. Fast acting valves in communication with the tanks are actuated to rapidly release a blast of air into the bridging pipes which lead to the nozzles adjacent the mouths of the filters to dislodge filter cake from the outer surface of the filters and it falls to the bottom of the bin.

The plurality of apertures is laid out in rows, with spaces between the rows. In one embodiment of the invention, a plurality of divider plates 128, 328 depends normally from the aperture plate. For example, one divider plate can be positioned in the space between each row of apertures. The tubular filters have a diameter and a first length. The divider plates have a height that is greater than the length of the tubular filters. The divider plates reduce the amount of released dust that is immediately taken up by adjacent rows of filters when the jets are pulsed to clean the filters. The plates also permit the aperture plate/filter assembly to rest on the ground without damaging the filters. Preferably, the filters are also arranged in columns. Any number of a plurality of filters can be used, say, from 2 to 1,000. The collector preferably comprises in the range of 10 to 100 filters, each having a diameter in the range of 4 inches to 16 inches (10 to 41 cm) and a length in the range of from 0.5 to 8 feet (0.15 to 2.4 m).

In one embodiment of the invention, each of the tubular filters has a longitudinal axis. The pulse-jet assembly preferably comprises a pair of generally parallel generally cylindrical reservoirs 130, 330 and a plurality of generally parallel cross pipes 132, 332 extending between the pair of reservoirs. Each cross-pipe is generally in superposition with a row of apertures. The plurality of nozzles extends laterally from the plurality of cross pipes, each nozzle being in alignment with a longitudinal axis of a tubular filter.

Figure 5:
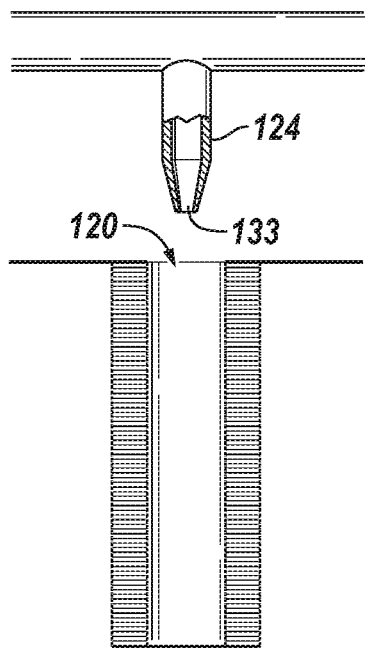
FIG. 5 is a pictorial view, in part cross section, of one type of nozzle useful in the invention.
Figure 6:
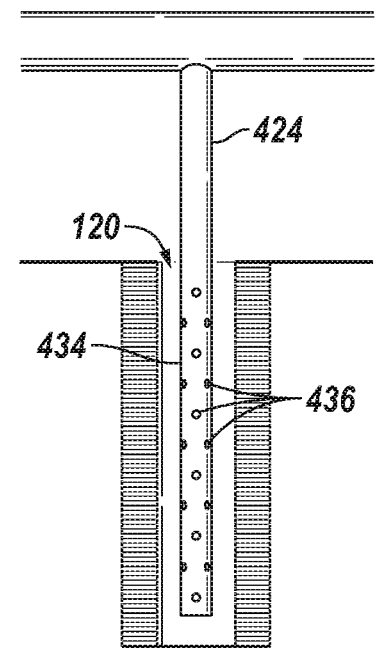
FIG. 6 is a pictorial view, in part cross section, of another type of nozzle useful in the invention.

In the embodiment shown in FIG. 5, each nozzle 124 has a downwardly-directed outlet 133 positioned near the aperture of the plate. In the embodiment shown in FIG. 6 each nozzle 424 has a downwardly extending body 434 passing though the aperture of the plate and a plurality of radially outwardly directed ports 436.

For operation, the portable dusty air cleaner further includes at least one exhaust fan 138, 338 positioned to draw dirty air into the bin/filter chamber. In one embodiment of the invention, a conduit 140, 340 connects an exhaust fan in flow communication with the clean gas chamber so that dirty gas is drawn into the bin, passes through the filters, and enters the clean-gas chamber. The exhaust fan can be positioned a distance from the dusty air cleaner if desired. Outlet locations may be placed to suit external ducting requirements. The ducting is large diameter, on the order of a foot (0.3 m) or more. The fan is of the high volume, low pressure difference type, for example, a fan having a volume capacity of over 1,000 cubic feet (28.3 cubic meters) per minute.

In a preferred embodiment, the bin has the general shape of an open top rectangularly sided box having a length, a width, and a height, the length being greater than the width or height. If desired, at least one pair of rollers or skids 142, 342 is on the bottom of bin to facilitate moving the bin in the direction of its length. Suitable bins generally have a volume of at least two cubic meters. The width and height of the bin are preferably each in the range of 3 to 10 feet, (0.9 m to 3 m) more preferably about 8 feet (2.4 m) wide by 6 or less feet (1.8 m) tall. The total height of the assembly, including the clean-air chamber, is preferably less than about 8.5 feet (2.6 m) to stay within standard road-transportable specifications when hauled on a trailer. A haul-away construction type dumpster which is typically hauled away on the back of a truck and has steel wheels would be generally suitable, or could be modified to be suitable and is preferred in the one embodiment of the invention. Such dumpsters can be assembled to embody the invention and loaded and transported in the same way as conventional roll-off dumpsters. Such bins comprise four vertical sidewalls extending upwardly from a floor and preferably have a lip around their upper end that is easy to seal with a gasket, and are road-transportable.

Figure 8:
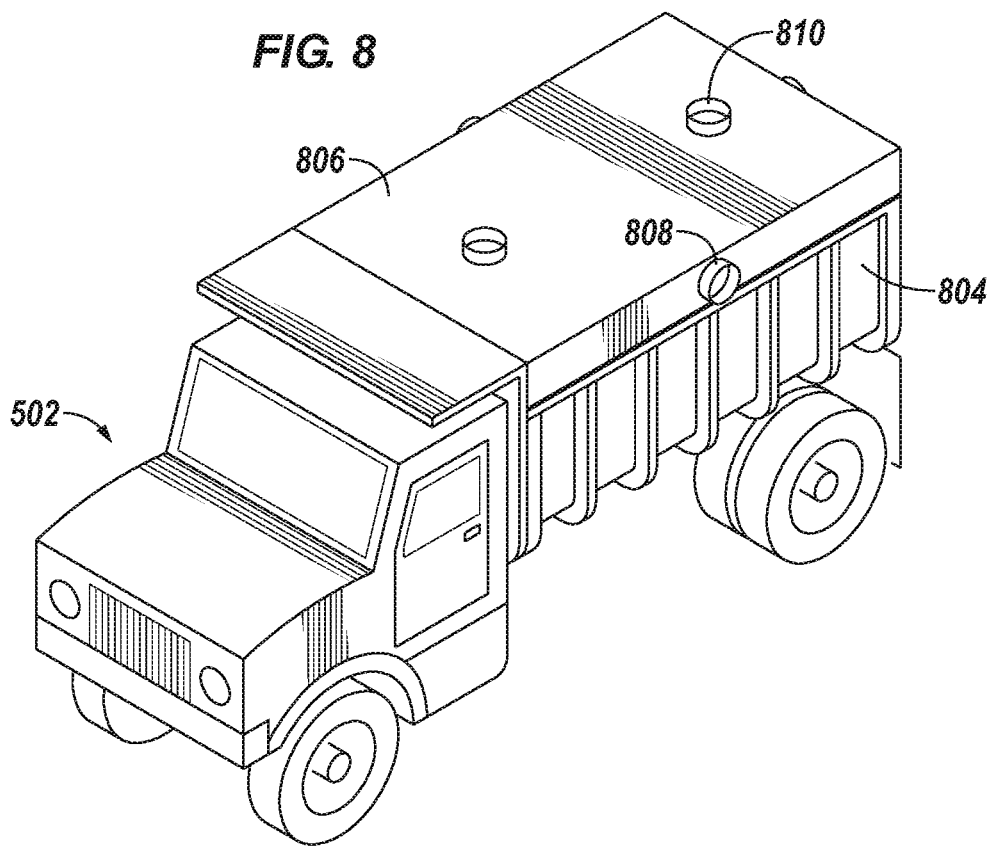
FIG. 8 is a pictorial view of a dump truck modified in accordance with an embodiment of the invention.
Figure 9:
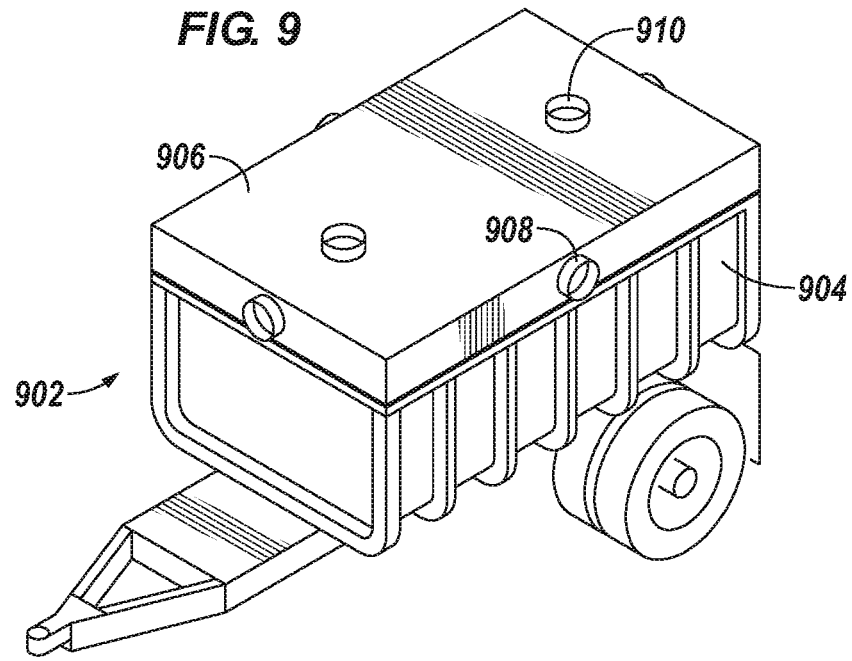
FIG. 9 is a pictorial view of a dump trailer modified in accordance with an embodiment of the invention.
Figure 10:
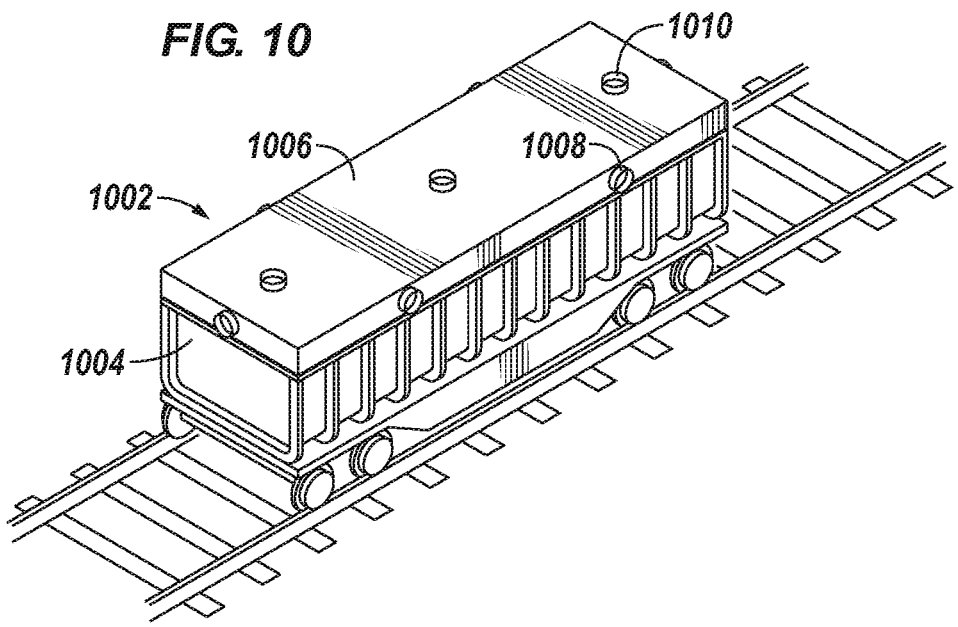
FIG. 10 is a pictorial view of a railroad car modified in accordance with an embodiment of the invention.

A dump truck, trailer or railroad car-mounted bin may also be suitably sealed to be used as a convenient dust collection bin for incorporation into the modular dusty air cleaner invention. With reference to FIG. 8, a dump truck 802 is provided with a dump bed 804 serving as a bin that has been topped with a collector assembly 806 comprising the aperture plate with filters, distributor, clean gas chamber and pulse jet assembly. The assembly is shown with inlets 808 for the admission of dusty air and outlets 810 for the withdrawal of clean air. In FIG. 9, a trailer 902 is provided with a bed 904 serving as a bin that has been topped with a collector assembly 906 comprising an aperture plate with filters, a distributor, a clean gas chamber and pulse jet assembly. The assembly is shown with inlets 908 for the admission of dusty air and outlets 910 for the withdrawal of clean air. In FIG. 10, a rail car 1002 is provided with a bed 1004 serving as a bin that has been topped with a collector assembly 1006 comprising the aperture plate with filters, a distributor, a clean gas chamber and a pulse jet assembly. The assembly is shown with inlets 1008 for the admission of dusty air and outlets 1010 for the withdrawal of clean air.

An upper end of the sidewalls of the bin lies generally in a plane, and at least a portion of the dirty-gas distributor in one embodiment of the invention is positioned next to the upper end of at least one of the sidewalls. If disassembly is desired, a gasket or sealing element 144, 344 can be positioned at the upper end of the sidewalls between the sidewall and dirty-gas distributor. Gaskets or sealing elements are preferably used between all the elements of the invention that are constructed for later disassembly.

In a preferred embodiment, the dirty gas distributor comprises a tubular sidewall forming a tunnel extending at least partway around the periphery of the upper end of the sidewalls of the bin. The tubular sidewall has a multiplicity of downwardly or laterally inward directed orifices 146, 346 opening toward the floor of the bin or toward the lanes between the filters. The distribution duct may be limited to two ducts, one on either side, with a vertically oriented connecting plate at each end providing end walls for the clean-gas chamber. The dirty gas distributor in one embodiment is similarly shaped to the top end of the bin. For example, it can be rectangular when the top of the bin is rectangular. The tubular sidewall preferably also has a generally rectangular cross-section across the tunnel, to facilitate fabrication and sealing. In one embodiment, the aperture plate is positioned against an outside wall of the tunnel. For example, it can be positioned generally coplanar with a bottom wall of the tunnel. See FIG. 3. In another embodiment, the aperture plate is positioned generally coplanar with a top wall of the tunnel. See FIG. 1. It is also feasible for the tubular sidewall to extend around an outer periphery of the aperture plate. For example, the aperture plate could be mounted to a flange extending inwardly toward the center of the bin from the vertical inside wall of the gas distributor.

Figure 2:
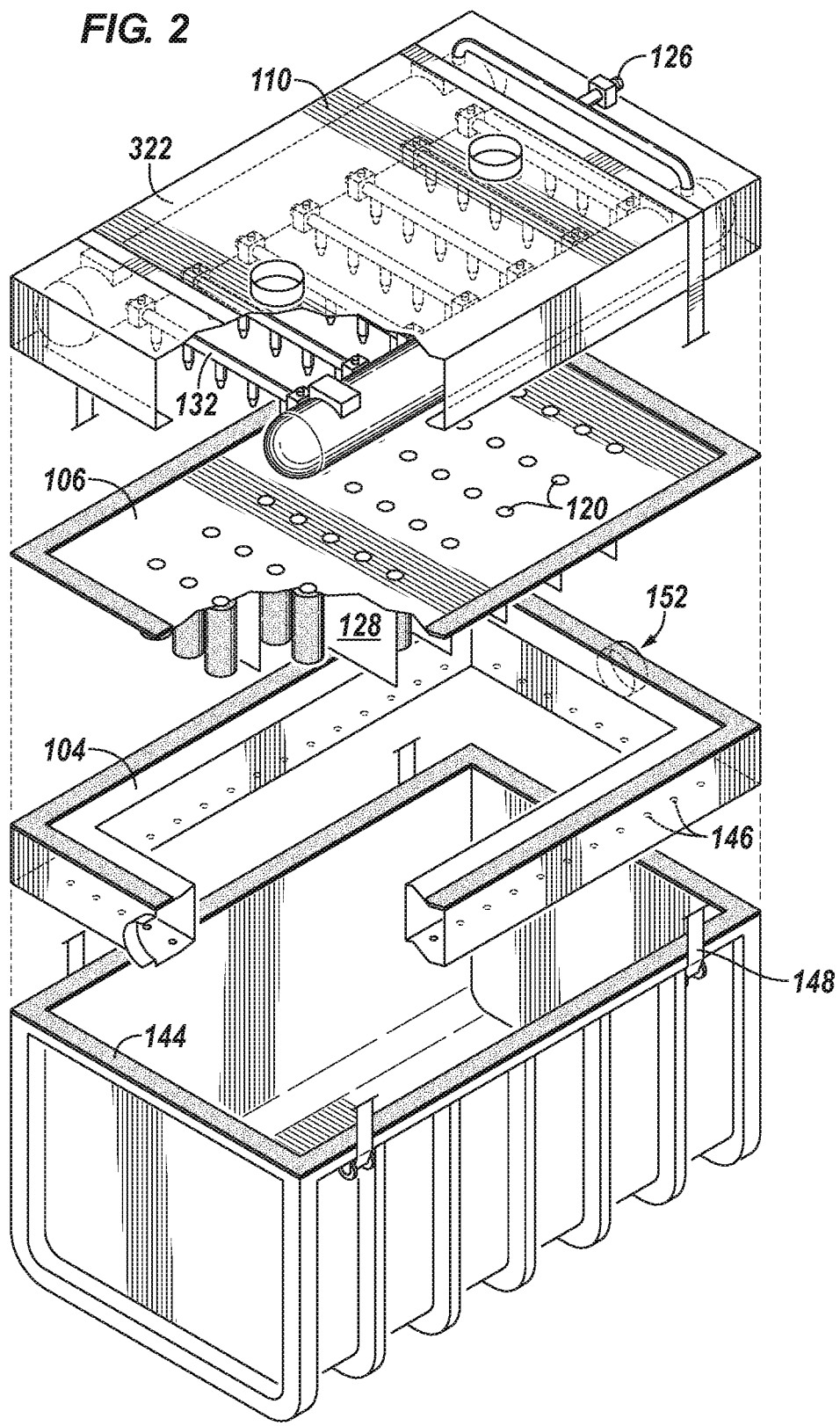
FIG. 2 is an exploded view of the invention of FIG. 1 with portions broken away or in ghost to show details.

In the illustrated embodiments, at least a portion of the pulse-jet assembly is modular and is positioned beneath the roof. In one embodiment mounting means connect the assembly to the roof. The pulse-jet assembly and roof in this embodiment detach as a unit from the aperture plate. See FIG. 2. The aperture plate and filters can detach as a unit from the dirty gas distributor. See FIG. 2. If desired, the aperture plate, filters and dirty gas distributor detach as a unit from the bin. See FIG. 4. Also if desired, the pulse jet assembly, roof, aperture plate, filters and dirty gas distributor can detach as a unit from the bin. This provides for quick turnaround in a shop setting, and the possibility of simply trading out an empty bin for a full one in the field, and bringing the unit back online. The full bin could be covered with a tarpaulin or plate for transportation to a disposal facility. The assembly can be releasably fastened together by any suitable means, for example, straps 148, 348, preferably with racheting tighteners.

If desired, at least a portion of the pulse-jet assembly can be mounted atop the aperture plate. Mounting means can attach the assembly to the plate. In such an assembly, the roof, pulse-jet assembly, aperture plate and filters can detach as a unit from the dirty gas distributor, or the roof, pulse-jet assembly, aperture plate, filters and dirty gas distributor detach as a unit from the bin to permit quick turnaround using a lifting hoist or jacks.

In one embodiment, the collector is provided with pairs of fast-acting valves 150, 350 on the cross pipes, one pair of fast-acting valves per cross-pipe, one fast-acting valve on each end of each cross-pipe. The collector is preferably in this embodiment provided with an actuator mechanism to actuate the valves, one pair at a time. The actuators can be electrically or pneumatically triggered.

In use, the portable dusty air cleaner is connected to a source 152, 352 of dust-laden gas with a duct. The duct will typically have an inside diameter of at least a foot (0.3 m).

Typically, the source will be a room, compartment or other enclosure where airborne dust-generating operations are being performed. The dusty air cleaner is positioned near the dusty enclosure, the dirty gas distributor is attached to the dusty enclosure with the duct, and the exhaust fan, located to draft air through the collector, is actuated. The vacuum at the mouth of the duct is low, generally less than 10 inches (25.4 cm) of water. Preferably, flow of dusty air across the dusty enclosure to the duct is also provided for so that operation of the device ventilates the room.

Typically, the portable dusty air cleaner will be transported to a location and a duct will be attached to the dirty gas distributor to connect the collector to the dusty enclosure, typically a room with airborne dust. The exhaust fan, if separate from the unit, is attached to the clean air chamber with a duct and actuated to draw dusty air from the dusty enclosure and into the bin. In the collector, the dusty air is drawn through the filters, the dust collects on the filter media, removing the dust from the dusty air. The clean air is then released back to the environment. The source of compressed gas is also attached to the pulse jet assembly and a short duration, high velocity gas jet is pulsed into and through the filters in a reverse flow direction from time to time to clean them. The accumulated cake falls to the bottom of the bin. Preferably, the filters are of the cartridge type with a pleated filter media. The media is selected based on the dust being collected. For example, HEPA quality filters can be used if desired.

Figure 11:
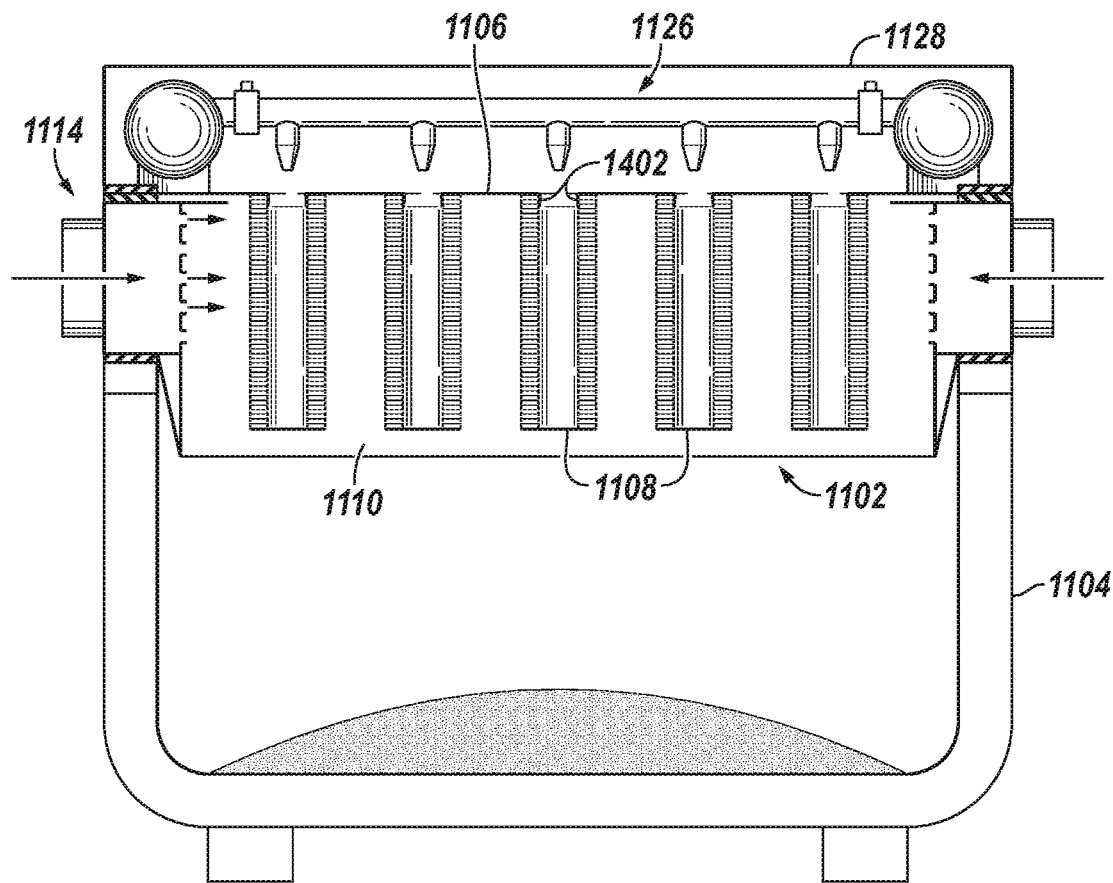
FIG. 11 is a schematic cross sectional view of another embodiment of the invention.

The required filters can be deployed as units in one or more magazines 1102, 1202 of filter cartridges, the magazines being shaped to fit a rectilinearly shaped dust bin 1104, 1204, or any hopper or hopper system having a mouth which will accept one or more magazines. The bin can be as described before, with a rectangularly shaped open upper end bounded by four opposed side walls. Each magazine comprises an aperture plate 1106, 1206 and a plurality of filters 1108, 1208. Each aperture plate defines a plurality of apertures and is sized to form at least a partial ceiling for the bin. The apertures are preferably arranged in rows and columns. A plurality of tubular filters sized to hang into the bin from the apertures are deployed, one per aperture. In a preferred embodiment, four side walls extend in a direction normal to the aperture plate peripherally to the plurality of tubular filters and form an open-bottomed box having a height sufficient to contain the tubular filters. In one embodiment, (FIG. 11), the side walls serve to channel dust downwardly when the dusty gas is introduced into the unit, and during filter cleaning, as well as to facilitate manufacturing and transportation of the device. A dirty gas distribution means 1114, 1214 is positioned to distribute dirty gas into the upper end of the bin from a peripheral location with respect to the aperture area of the plate. The dirty gas distribution means preferably comprises a pair of parallel tubular sidewalls forming a pair of tunnels spaced apart from each other at a spacing distance so as to rest on the upper ends of opposed bin sidewalls. See FIG. 11. A second pair of tubular sidewalls can connect the ends of the first pair so that the distributor is generally rectangular in one embodiment. See FIG. 12.

The tubular sidewalls forming the distributor preferably each has opposite top and bottom walls, and opposite outer and inner walls, and the top wall is approximately coplanar with the aperture plate. This permits the filters to hang into the bin when the magazine is deployed in a way to reduce overall equipment height.

In one embodiment of the invention, the inside walls of the distributor are provided with nozzles 1216 that direct the dirty gas flow away from direct impingement on the filters, generally between the rows and/or columns of filters. Preferably the flow is directed between the rows. The nozzles can be formed by making "I" shaped cuts in the wall of the distributor, leaving opposed "wings" alongside the vertical cut, and then bending the opposed wings outwardly to form rectangular openings in the wall of the distributor bounded by the bent wings (louvers) inclined toward each other. The purpose of the louvers is to reduce erosion of the filters by particle impingement.

The magazine is preferably deployed in combination with a portable bin, although it can also be used in conjunction with fixed collector systems employing hoppers and like. A hopper is essentially a bin with a converging bottom leading to an outlet. A plurality of magazines for filter cartridges can be positioned on larger bins to form at least a partial ceiling for the bin. For example, the aperture plate and dirty gas distributor can measure, say about 8 feet (2.4 m) by about 5 feet (1.5 m), and three magazines can be deployed side by side to cover an 8×15 foot (2.4×4.6 m) bin. Each magazine can contain 15 filters, arranged in a 5×3 array.

If desired, a modular fan unit 1218 can be positioned directly on the bin alongside one or more of the magazines. Preferably, the fan unit has the same footprint on the bin as one of the magazines for the filter cartridges. The fan unit includes a tray 1220 to partly house one or more blowers and to form part of the ceiling for the bin. The tray is positioned sealingly across the bin. The tray protrudes into the dust collecting chamber of the bin and partly bounds the dust collecting chamber. The at least one blower in the housing has an intake drawing from the overhead clean air chamber. In one embodiment, the blower intake is through a cell plate defining apertures 1224, 1224' so that the fan unit housing outside of the internal passage through the blower is sealed from both the clean air chamber and the dust collecting chamber. In one embodiment the blower exhausts from the blower housing laterally. As an example, and as illustrated in FIG. 12, an 8×15 foot (2.4×4.6 m) bin can be provided with a pair of approximately 5×8 foot (1.5×2.4 m) magazines and an approximately 5×8 foot (1.5×2.4 m) blower unit situated between them.

A pulse jet assembly 1126, 1226 is preferably positioned in the clean air chamber above each filter cartridge assembly. Each pulse jet assembly preferably comprises a pair of generally parallel generally cylindrical reservoirs for storing compressed air, a plurality of generally parallel cross pipes extending between the pair of reservoirs, each cross-pipe being generally in superposition with a row of apertures on the cell plate, and a plurality of nozzles extending laterally from the plurality of cross pipes, each nozzle being in alignment with a longitudinal axis of a tubular filter depending from the cell plate. The pulse jet assembly is preferably of unitized construction and is contained in an open-bottomed box 1128, 1228 comprised of lateral sidewalls and a roof.

Figure 12:
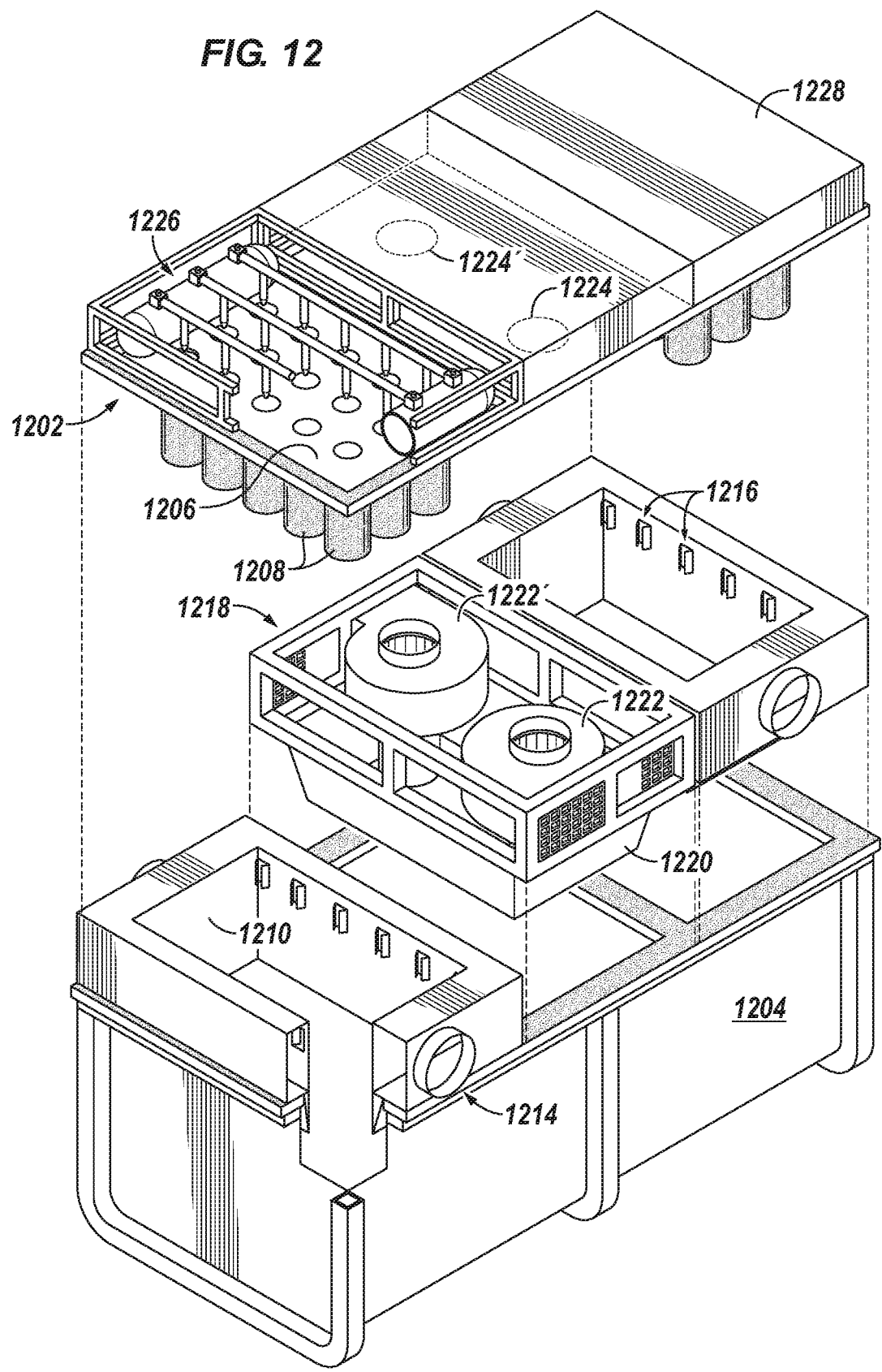
FIG. 12 is an exploded view of another embodiment of the invention. Dashed lines are used to show hidden features and layup. Portions are cut away to more clearly show underlying structure.
Figure 13:
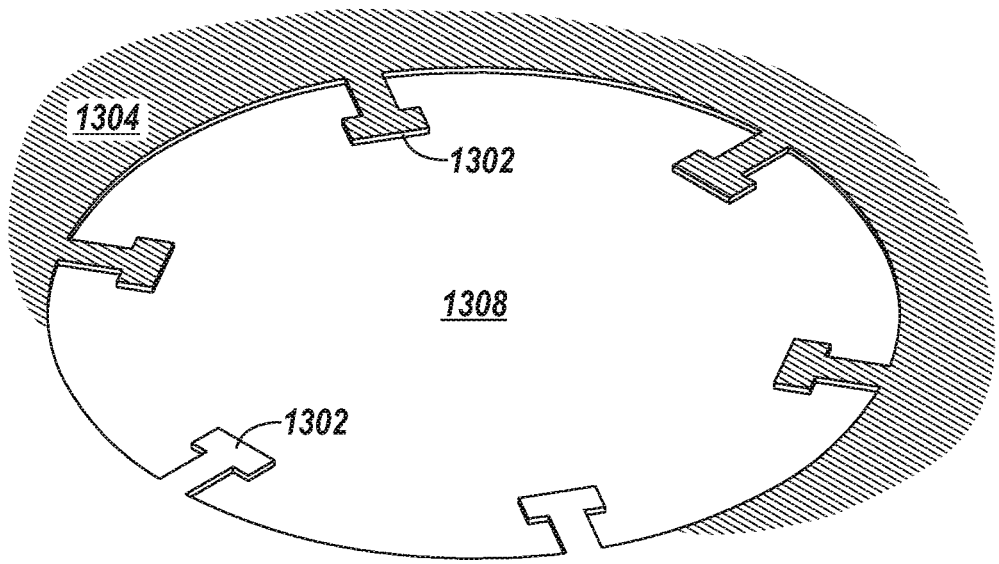
FIG. 13 illustrates pictorially a portion of a precursor to a cell plate used in one embodiment of the invention.
Figure 14:
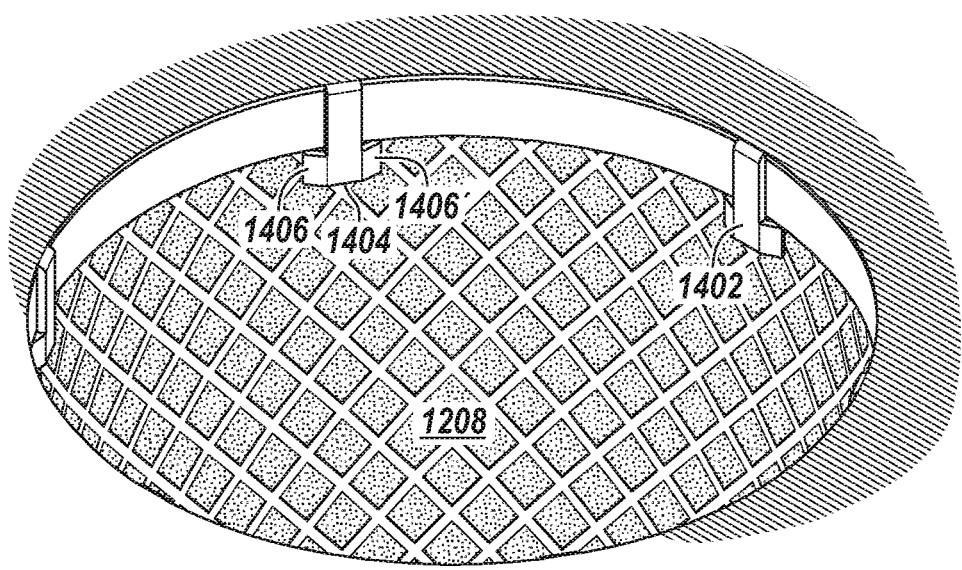
FIG. 14 illustrates detailed features of a portion of a cell plate used in one embodiment of the invention.

In the embodiment of the invention shown in FIG. 12, the magazines would be alternately cleaned by the pulse-jet assembly. All the filters in a single magazine would be cleaned at the same time.

In one embodiment of the invention, there is provided a portable dusty air cleaner comprising an exchangeable bin, at least one dust-laden gas distributor, an aperture plate, a plurality of tubular filters, a roof, a clean gas chamber, a bin/filter chamber, and a pulse-jet assembly. The exchangeable bin has an upper end and a lower end. The dust-laden gas distributor is positioned to distribute dust-laden gas into the bin/filter chamber, preferably from a plurality of peripheral locations. The aperture plate defines a plurality of apertures forming at least a partial a ceiling for the bin. The plurality of tubular filters hangs into the bin from the apertures, one per aperture. A roof is positioned above the aperture plate. A clean-gas chamber is defined between the plate and the roof. A collecting chamber for dust is defined between the plate and the bin. The clean-gas chamber is partly defined by a peripheral wall extending between the aperture plate and the roof. A pulse-jet assembly is positioned at least partly in the clean-gas chamber. The pulse-jet assembly including a plurality of nozzles for pulsing jets of gas down the plurality of filters, one nozzle per filter.

Preferably, the plurality of apertures is laid out in rows and columns, with spaces between the rows and columns. In one embodiment of the invention, a plurality of tabs 1402 extends downwardly from the periphery of each aperture and retains a tubular filter 1108 in a hanging position from the aperture. In one embodiment of the invention the tabs form retaining hooks and attach the tubular filters to a bottom side of the aperture plate.

Preferably, each of the plurality of tabs is integral with the aperture plate. Preferably, each of the plurality of tabs has a tongue portion 1402 which is bent downwardly from a periphery of an aperture and a pair of wing portions 1406, 1406' at the depending end of the tongue portion which are bent outwardly from the axis of the aperture to engage a tubular filter depending from the aperture from the inside of the tubular filter. In one embodiment of the invention, the pair of wing portions acts as barbs to retain the tubular filters in position alongside a bottom of the aperture plate.

In one embodiment of the invention, four wall plates (1210 shown) extend in a direction normal to the aperture plate and form a bottomless box around the plurality of tubular filters. Preferably, the four wall plates depend from the dust-laden gas distributor and, together with an inside wall of the distributor, form a bottomless box around the plurality of tubular filters. The tubular filters can have a diameter and a first length and the wall plates together with the gas distributor have a height that is adequate to contain the length of the filters in the box. This arrangement facilitates manufacturing and transporting the assembly. Preferably, an upper portion of at least a pair of the wall plates defines inside walls for the dirty gas distributor.

The aperture plate 1304 in one embodiment of the invention can be separately manufactured and sold. The plate defines a plurality of apertures 1308 and is sized to form at least a partial ceiling for a bin. The apertures are preferably arranged in rows and columns. Each aperture has a generally circular periphery with a plurality of generally radially inwardly extending T-shaped tabs 1302. The plurality of apertures in a plate preferably range from 4 to 50 in number, and the plurality of tabs for each aperture range from 3 to 30 in number. Each tab preferably extends radially inwardly a distance in the range of 0.05 to 0.5 D, wherein D is the diameter of the aperture across a circular section of the aperture.

In one embodiment of the invention, the magazine can be separately manufactured and sold. The magazine can comprise an aperture plate, a plurality of tubular filters, and a plurality of plates. The aperture plate defines a plurality of apertures and is sized to form at least part of a ceiling for a bin. The plurality of tubular filters is for hanging into the bin from the apertures, one per aperture, and is attached to the aperture plate. The plurality of plates in one embodiment extends in a direction normal to the aperture plate alongside the plurality of filters to protect the filters. The filters have a height and the plates have a height that is preferably at least as great as the filters. See FIG. 1 for example. In another embodiment, the magazine further comprises a distributor for dirty gas positioned along at least two opposed edges of the aperture plate. At least four plates depend from the dirty gas distributor and form a bottomless box around the plurality of filters. See FIG. 12 for example.

The magazine preferably further comprises a dirty gas distributor contacting the cell plate and positioned to distribute dirty gas into the bin/filter chamber, preferably from a periphery of the filters. See FIGS. 11 and 12. In one embodiment, the dusty gas is introduced downwardly into the bin. See FIG. 1. In another embodiment, the dusty gas is introduced laterally from the gas distributor between the rows of filters. See FIG. 12.

In one embodiment of the invention, the bin comprises four vertical sidewalls extending upwardly from a floor. An upper end of the sidewalls lies generally in a plane. In other words, the bin is preferably box-shaped. The dirty gas distributor comprises a pair of tubular sidewalls forming a pair of tunnels extending along the upper ends of opposite sidewalls of the bin. See FIG. 11. The bottom side wall of the tunnel is preferably positioned on the upper ends of opposite sides of the bin. Preferably, each tubular sidewall has a generally rectangular cross-section across the tunnel and the aperture plate is positioned generally coplanar with a top side wall of the tunnel. Gas is introduced laterally into the dust collecting chamber through the sidewalls of the tunnel in a direction parallel to the columns of filters.

In another embodiment of the invention, the bin comprises four vertical sidewalls extending upwardly from a floor. An upper end of the sidewalls lies generally in a plane. In other words, the bin is preferably box-shaped. The dirty gas distributor comprises a first pair of tubular sidewalls forming a pair of tunnels extending along the upper ends of opposite sidewalls of the bin and a second pair of tunnels connected to the ends of the first pair of tunnels extending across the bin. See FIG. 12. The bottom side walls of the first pair of tunnels is preferably positioned on the upper ends of opposite sides of the bin. Preferably, each tubular sidewall has a generally rectangular cross-section across the tunnel and the aperture plate is positioned generally coplanar with a top side wall of the tunnel. Gas is introduced laterally into the dust collecting chamber through the sidewalls of the second pair of tunnels from a location in a direction between the rows of filters.

Figure 15:
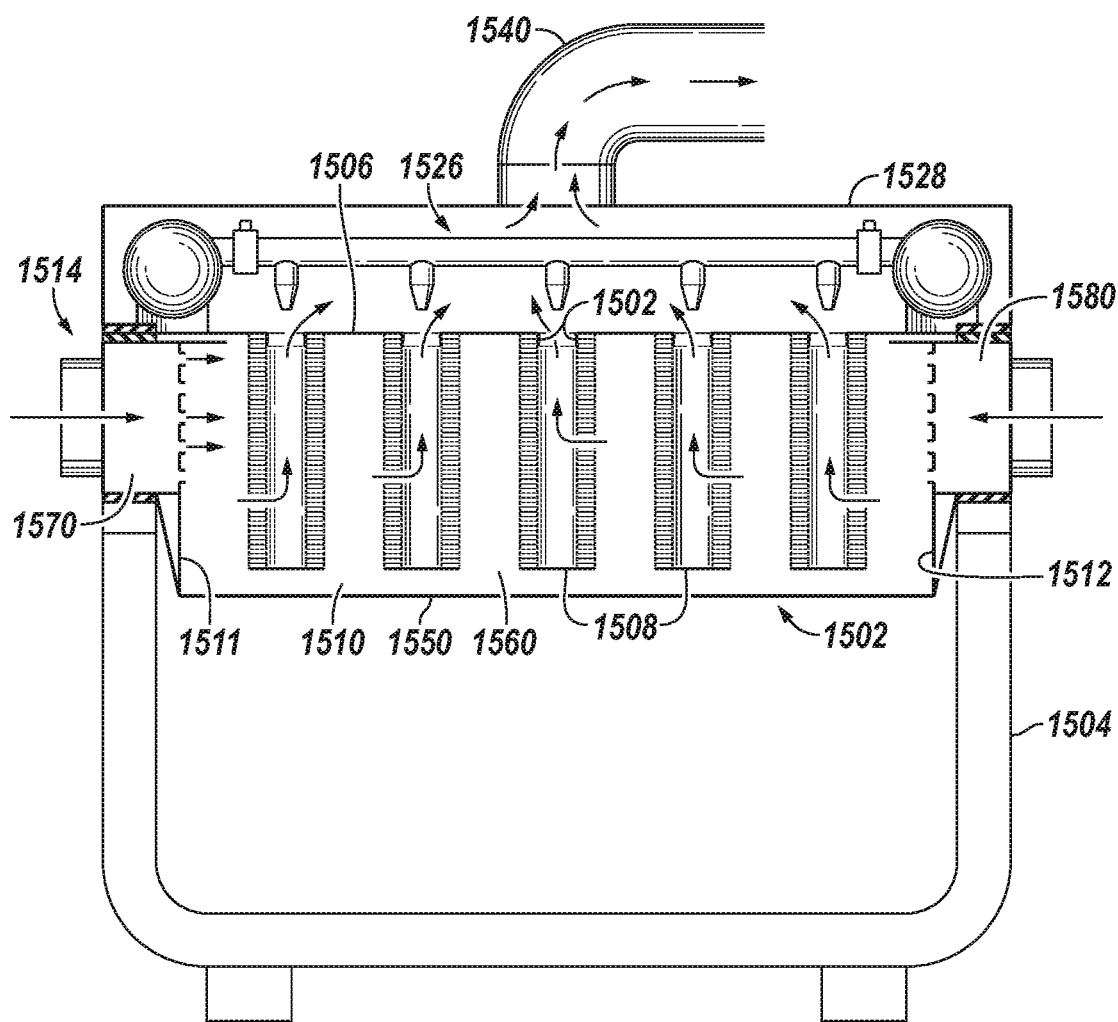
FIG. 15 is a schematic cross sectional view of another embodiment of the invention.

In another embodiment of the invention, the required filters can be deployed as units in one or more magazines 1502 of filter cartridges, the magazines preferably being shaped to fit a rectilinearly shaped dust bin 1504 or any hopper or hopper system having a mouth which will accept one or more magazines. The bin can be as described before, with a rectangularly shaped open upper end bounded by four opposed side walls. Each magazine comprises an aperture plate 1506 and a plurality of filters 1508. Each aperture plate defines a plurality of apertures and is sized to form at least a partial ceiling for the bin, and preferably a total ceiling for the magazine. The apertures are preferably arranged in rows and columns. A plurality of tubular filters sized to hang into the bin from the apertures are deployed, one per aperture. In a preferred embodiment, four depending side walls 1510, 1511, 1512 shown, extend in a direction normal to the aperture plate peripherally to the plurality of tubular filters and are closed by a bottom plate 1550 to form a closed-bottomed box having a height sufficient to contain the tubular filters. The box forms a dust collection chamber 1560. When the dust capacity of the chamber has been reached, the entire magazine, dust, filters and all, is removed and safely disposed of. The side and bottom walls of the magazine are preferably formed of sheet metal, to hold down costs. In one embodiment, (FIG. 15), a dirty gas distribution means 1514 is positioned to distribute dirty gas into the dust collection chamber from a peripheral location with respect to the aperture area of the plate. The dirty gas distribution means preferably comprises a pair of parallel tubular sidewalls forming a pair of tunnels 1570, 1580 spaced apart from each other. Where the magazine is deployed on a bin, the tunnels are preferably spaced at a spacing distance so as to rest on the upper ends of opposed bin sidewalls. See FIG. 15. A second pair of tubular sidewalls can connect the ends of the first pair so that the distributor is generally rectangular in one embodiment. The tubular sidewalls can be provided with nozzles directed between the filters as described elsewhere herein if desired.

The tubular sidewalls forming the distributor preferably each has opposite top and bottom walls, and opposite outer and inner walls, and the top wall is approximately coplanar with the aperture plate. This permits the filters to hang into the closed dust collection chamber of the magazine in a way to reduce overall equipment height.

The closed-bottom magazines can be deployed in the same applications and with the same associated bins, exhaust conduit 1540, blowers, a pulse-jet assembly 1526, a cover 1528, etc., as the open-bottom magazines described herein, or without a surrounding bin or hopper if desired.

In another embodiment of the invention, dust is collected on the inside of the tubular filters. This embodiment of the invention preferably employs ultrafine filtration with a microporous filter wall. In one embodiment, HEPA filters are used. In another embodiment of the invention, the filter walls further contain a sorbent, typically active carbon or charcoal. For long life, the sorbent can be impregnated with chemisorption agents specific for the gas(es) to be removed. This embodiment of the invention is preferably utilized downstream of a primary filtration step, as a secondary filtration.

Figure 16:
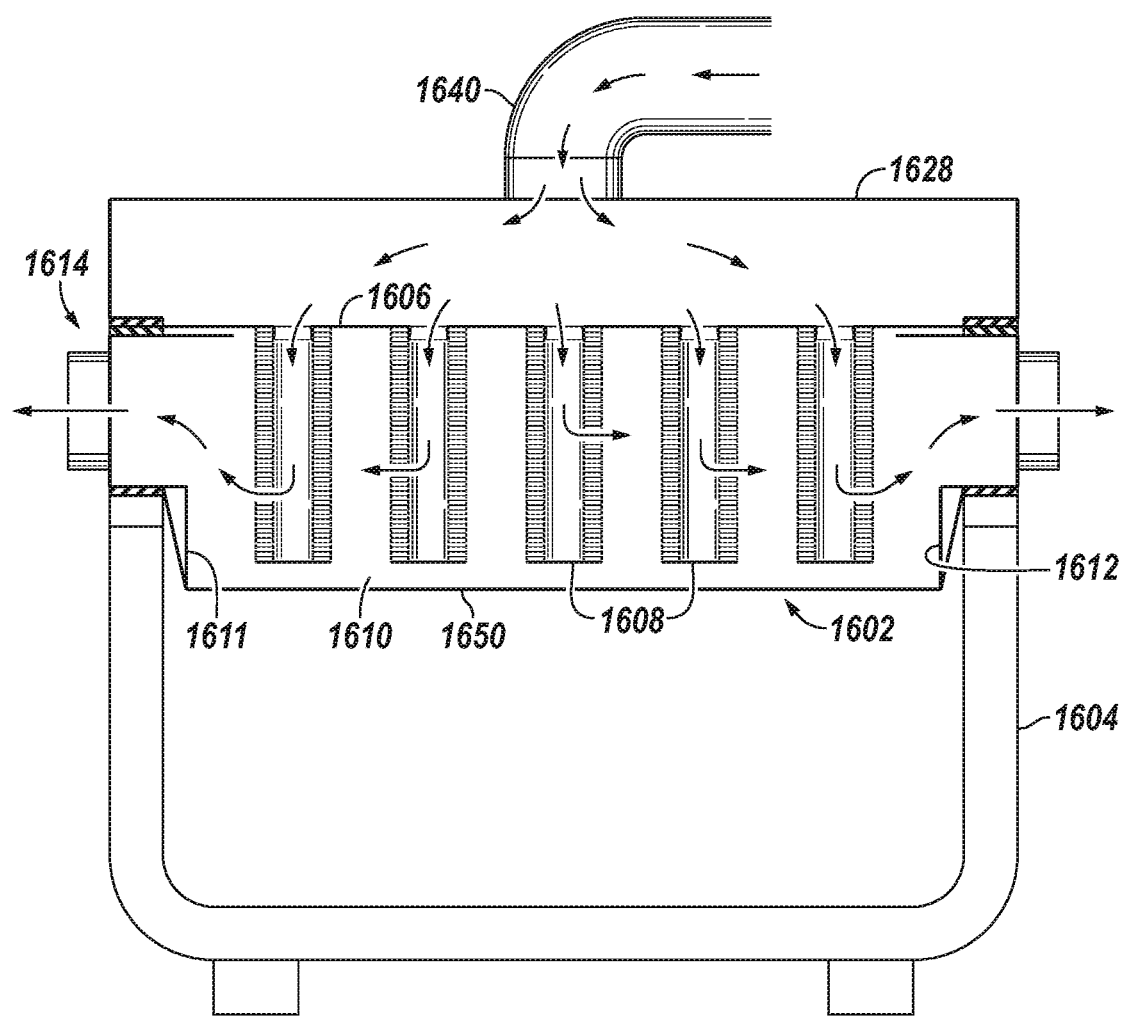
FIG. 16 is a schematic cross sectional view of another embodiment of the invention.

Referring to FIG. 16, the required filters can be deployed as units in one or more magazines 1602 of filter cartridges. The magazines can be shaped to fit a rectilinearly shaped dust bin 1604 or any hopper or hopper system having a mouth which will accept one or more magazines, or they can be standalone. The bin can be as described before, with a rectangularly shaped open upper end bounded by four opposed side walls. Each magazine comprises an aperture plate 1606, and a plurality of filters 1608. Each aperture plate defines a plurality of apertures and is sized to form at least a partial ceiling for the bin. Preferably, the aperture plate forms a total ceiling for the magazine. The apertures are preferably arranged in rows and columns. A plurality of tubular filters sized to hang into the bin from the apertures are deployed, one per aperture. In one embodiment, the magazine can include four side walls 1610, 1611, 1612 shown, depending in a direction normal to the aperture plate peripherally to the plurality of tubular filters to form an open bottomed box. If desired, an end closure plate 1650, the combination forming a closed-bottomed box having a height sufficient to contain the tubular filters, can be used. A filtered gas exhaust port or ports are positioned to draw clean gas from the bin or closed box. The same elements as before described can be used, except with reverse air flow. For exampled, a filtered gas exhaust means 1614 can be positioned to withdraw clean gas from the upper end of the bin from a peripheral location with respect to the aperture area of the plate. The filtered gas distributed exhaust means can be in the form of a pair of parallel tubular sidewalls forming a pair of tunnels spaced apart from each other at a spacing distance so as to rest on the upper ends of opposed bin sidewalls. See FIG. 16. A second pair of tubular sidewalls can connect the ends of the first pair so that the distributor is generally rectangular in one embodiment. The inside walls of the tunnels are provided with ports 1616 facing the filters to draw the gas into the tunnels.

The magazine is preferably deployed in combination with a portable bin, although it can also be used in conjunction with fixed collector systems employing hoppers and like, or it can be standalone. A plurality of magazines for filter cartridges can be positioned on larger bins to form at least a partial ceiling for the bin.

A roof 1628 is positioned above the aperture plate. In this embodiment, a semi-filtered gas chamber is defined as the space between the plate and the roof effectively forming an air plenum. An inlet 1640 provides for semi-filtered gas flow into the semi-filtered gas chamber. The semi-filtered-gas chamber is partly defined by a peripheral wall extending between the aperture plate and the roof. The pulse-jet assembly is unnecessary and ordinarily absent. Filtered gas is drawn into the filtered gas chamber and flows downwardly through the apertures and into the tubular filters. From there it flows outwardly through the micro-filtration wall of the tubular filters, and is optionally deodorized and/or chemically treated. Microfiltered air is drawn out of the volume beneath the plate and external to the filters and is exhausted from the unit, generally via a blower connected to the unit.

Figure 17:
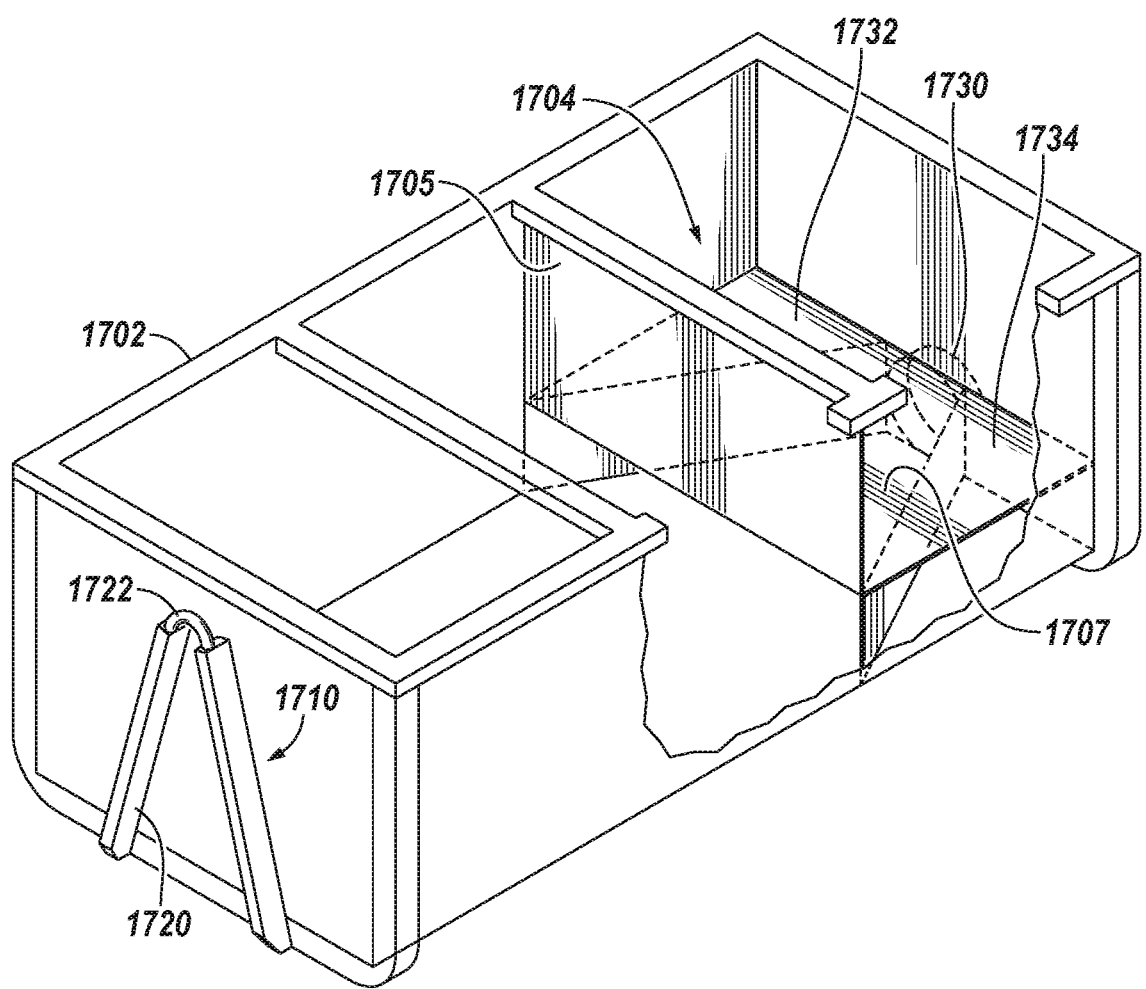
FIG. 17 illustrates pictorially another embodiment of the invention with portion broken away or shown in ghost lines.

With reference to FIG. 17, another embodiment of the invention provides a fitting 1710 on the bin 1702 to facilitate handling. The bin is generally elongated box-shaped, having two end walls. One of the end walls is provided with an inverted generally "V" shaped track 1720 mounted on its outside surface. The apex of the "V" faces upwardly, in the same direction as the open mouth of the bin, and is defined by a connecting link 1722 connecting the legs of the "V". The connecting link is spaced apart from the wall of the bin and is preferably formed from heavy rod or tubular to provide an attachment point for a hook or other connector to facilitate moving or lifting the bin.

Another embodiment of the invention provides a separate compartment 1704 in the bin for containing a blower cartridge and optionally a filter cartridge for backup and/or microfiltering and/or chemically treating or deodorizing the air previously passed through the main filter cartridges. The chamber is defined by the bin walls, a vertically bin partition wall 1705, and a horizontal compartment bottom wall 1707. Where the chamber contains only a blower cartridge, the blower draws air from an upper port from the attic and exhausts it. Where the chamber further contains a cartridge comprising filters or microfilters or chemically treating filters or deodorizing filters, gas flow is downward from the attic into the filter cartridge, radially outward through the filter walls, downward through the bottom of the filter cartridge, the upward into the blower cartridge through a lower port in the blower cartridge. See FIG. 19.

Another embodiment of the invention provides structure mounted inside the bin to facilitate dumping accumulated dust. The bin is generally elongated box-shaped, having two vertical end walls, two side walls, and a floor. One of the end walls is provided with a large through-port 1730 just above the level of the floor, the port preferably being centrally located. On the inside of the bin, large wedges 1732, 1734 are mounted to the floor in the corners of the bin to channel dust toward the port when the other end of the bin is lifted. The top side of each wedge is preferably walled off to prevent dust from accumulating behind the inclined surface of the wedge. The top side wall on the wedge is generally parallel to the floor of the bin. Where the dust collector employs a modular fan unit as shown in FIG. 12, the fan module is preferably positioned in the end of the bin above the wedges, preferably over a floor atop the wedges. If desired, a nozzle can be positioned on the port protruding from the unit to facilitate controlled dumping, and a cap positioned on the nozzle when the dust collector is in use to avoid disrupting flow.

Figure 18:
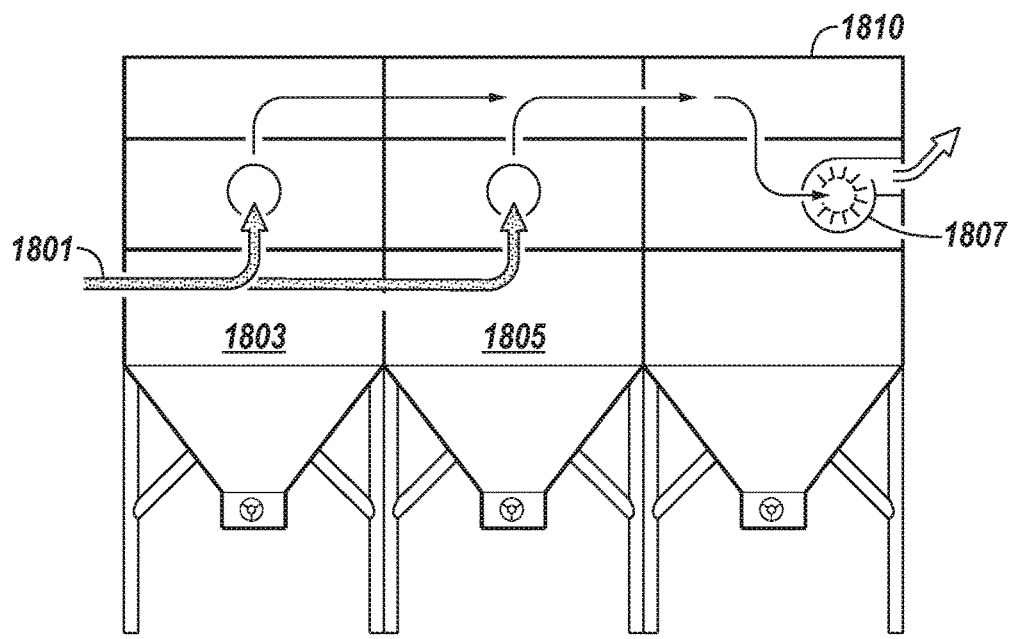
FIG. 18 illustrates schematically another embodiment of the invention showing gas flows.

FIG. 18 illustrates application of an embodiment of the invention to a hopper system. Dusty air 1801 is drawn into hopper dusty air chambers 1803, 1805 by blower 1807. The dust is removed by caking on the outside of the cylindrical filters carried by magazine units. Cover 1810 provides a housing for pulse jet assemblies and a clean air passage for internal gas flow to the blower.

Figure 19:
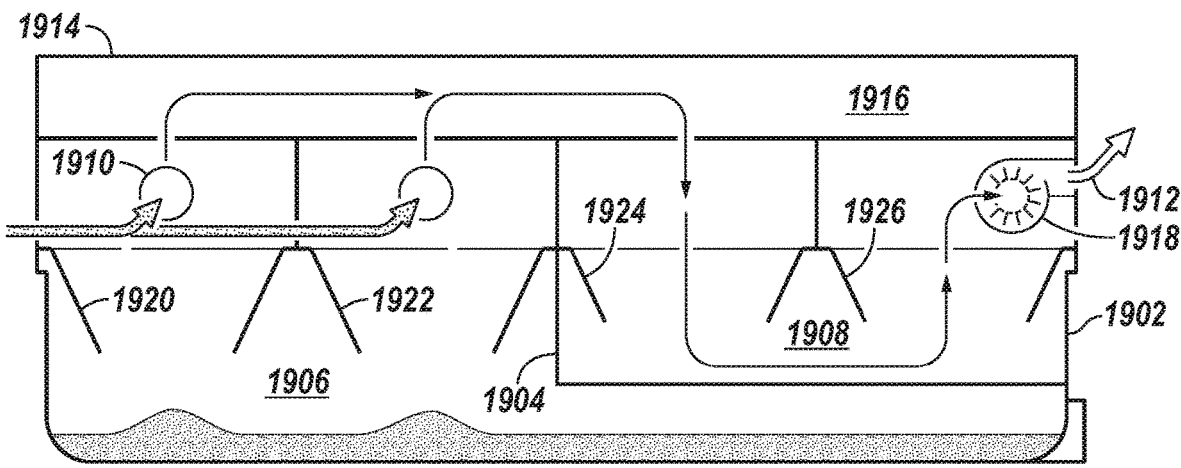
FIG. 19 illustrates schematically another embodiment of the invention showing gas flows.

FIG. 19 illustrates a bin 1902 having an open upper end and a closed lower end. A partition wall 1904 extends across the bin and divides the bin into a first chamber 1906 and a second chamber 1908. The first chamber has at least one dusty gas inlet 1910 and the second chamber has at least one clean gas exhaust 1912. An aperture plate as previously described defines a plurality of apertures forming at least a partial ceiling for the first chamber of the bin. A plurality of tubular filters for filtering dusty gas hang into the first chamber of the bin from the apertures, one per aperture. A cover 1914 is positioned above the aperture plate. A gas chamber or attic 1916 is defined between the aperture plate and the cover. The gas chamber is partly defined by a peripheral wall extending between the aperture plate and the cover. At least one exhaust fan 1918 is positioned in the second chamber in flow communication with the gas chamber to draw gas from the gas chamber and expel clean gas through the gas exhaust.

Preferably, the exhaust fan is carried by an open-bottomed cartridge 1926 that has an imperforate ceiling. Dust unable to penetrate the plurality of tubular filters accumulates on an outside surface of the plurality of tubular filters positioned in cartridges 1920 and 1922 from where it can drop to the bottom of the bin. Pulse jet assemblies not shown but as previously described preferably facilitate cleaning of the filters.

In a preferred embodiment, an open-bottomed cartridge 1924 positions a second aperture plate as previously described defining a plurality of apertures forming at least a partial ceiling for the second chamber of the bin. A second plurality of tubular filters for filtering dusty gas hangs into the second chamber of the bin from the apertures, one per aperture. The at least one exhaust fan positioned in the second chamber draws gas from the gas chamber and through the second plurality of filters and exhausts twice-filtered gas. Dust unable to penetrate the second plurality of tubular filters accumulates on an inside surface of the second plurality of tubular filters. The second plurality of filters can be of the same type as the first plurality, and provide back-up in the event of failure of a filter of the first plurality, or they can be microfilters, active carbon filters, chemically treated filters, etc. Preferably, the pluralities of tubular filters and the blower are carried by drop-in-position cartridges having open bottoms.

Each of the second plurality of filters can comprise a medium capable of neutralizing or absorbing of unwanted gaseous substances for example using a reagent like activated carbon, such reagent being contained within the filter element housing (like potting soil in a pot) or in the filter wall. Such a filter element can have dual function, that is, containing the treating agent and keeping super fine dust contained within the filter unit.

Figure 20:
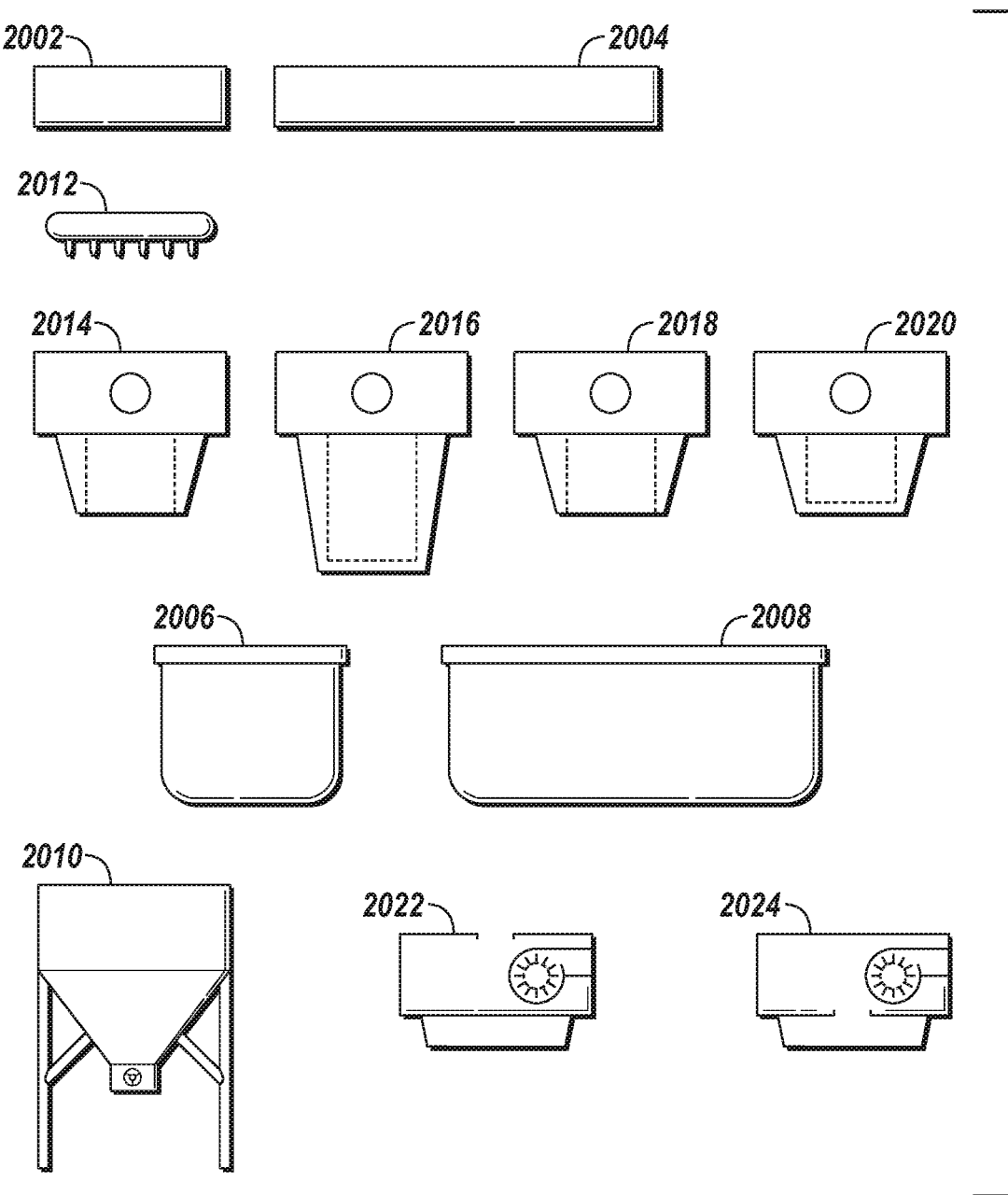
FIG. 20 is an illustration of combinable elements of the invention to illustrate the modularity and flexibility of the invention.

FIG. 20 illustrates the modularity of the invention. Covers 2002 and 2004 are sized to fit a selected bin 2006, 2008, 2010. Bins of the 2008 type are typically either 20 feet by 8 feet (6.1 m by 2.4 m), or 40 feet (12.2 m) by 8 feet (2.4 m). Pulse-jet assemblies 2012 are positioned under the covers and configured to clean the dust filters of a selected cartridge assembly, typically 2014, which has a footprint of 5 feet (1.5 m) by 8 feet (2.4 m). If desired, a closed disposable cartridge assembly 2016 can be employed where a hazardous dust is collected, or optionally, the bottom can be closed with a detachable collection device such as a bag. One or more cartridge assemblies of microfilters 2018 or active filters 2020 can also be used atop the selected bins if desired. A blower cartridge 2022 with a top entry can be used in one end of the bin where secondary filtration is not used, or a blower cartridge 2024 with a bottom entry to the blower can be used where secondary filtration is employed.

While certain preferred embodiments of the invention have been described herein, the invention is not to be construed as being so limited, except to the extent that such limitations are found in the claims.

The invention claimed is:

1. A magazine for filter cartridges comprising an aperture plate defining a plurality of apertures, a plurality of tubular filters hanging from the apertures, one per aperture, a dirty gas distribution means positioned to distribute dirty gas from a peripheral location with respect to the filters, said dirty gas to distribution means comprising a first pair of parallel tubular sidewalls forming a pair of tunnels spaced apart from each other, and a second pair of tubular sidewalls connecting the ends of the first pair, and four side walls attached to the dirty gas distribution means and extending in a direction away from the aperture plate and peripherally to the plurality of tubular filters to form a box having a height sufficient to contain the tubular filters and an end closure on the box opposite the aperture plate to form a dust collection chamber for collected dust, said magazine for filter cartridges being positioned on a bin and forming at least a partial ceiling for the bin and being removable as a unit from the bin for disposal of collected dust along with the unit.

2. A magazine for filter cartridges comprising an aperture plate defining a plurality of apertures, a plurality of tubular filters hanging from the apertures, one per aperture, a dirty gas distribution means positioned to distribute dirty gas from a peripheral location with respect to the filters, said dirty gas to distribution means comprising a first pair of parallel tubular sidewalls forming a pair of tunnels spaced apart from each other, and a second pair of tubular sidewalls connecting the ends of the first pair, and four side walls attached to the dirty gas distribution means and extending in a direction away from the aperture plate and peripherally to the plurality of tubular filters to form a box having a height sufficient to contain the tubular filters and an end closure on the box opposite the aperture plate to form a dust collection chamber for collected dust, said magazine for filter cartridges being positioned on a bin and forming at least a partial ceiling for the bin and being removable as a unit from the bin for disposal of collected dust along with the unit, wherein the tubular sidewalls each has opposite top and bottom walls, and outer and inner walls, and the top wall supports the aperture plate.

3. Apparatus as in claim 2, wherein the bottom walls of a pair of the tubular sidewalls is supported by the bin.

4. Apparatus as in claim 3 wherein the bin comprises an exchangeable rectilinear bin having an open upper end and a closed lower end, a roof is positioned above the at least one aperture plate, a clean-gas chamber is defined between the at least one aperture plate and the roof, said clean-gas chamber being partly defined by a peripheral wall extending between the at least one aperture plate and the roof, and a pulse-jet assembly is positioned at least partly in the clean-gas chamber, said pulse-jet assembly including a plurality of nozzles for pulsing jets of gas down the plurality of filters, one nozzle per filter.

* * * * *